United States Patent
Zhu et al.

(10) Patent No.: US 9,507,868 B2
(45) Date of Patent: Nov. 29, 2016

(54) METHOD, APPARATUS, AND SYSTEM FOR DISPLAYING USAGE RECORDS

(71) Applicant: Xiaomi Inc., Beijing (CN)

(72) Inventors: Yifan Zhu, Beijing (CN); Junqi Lin, Beijing (CN); Wankun Yang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/076,317

(22) Filed: Mar. 21, 2016

(65) Prior Publication Data
US 2016/0314218 A1   Oct. 27, 2016

(30) Foreign Application Priority Data
Apr. 27, 2015  (CN) .......................... 2015 1 0205717

(51) Int. Cl.
G07B 17/02 (2006.01)
G06F 17/30 (2006.01)
G06K 19/04 (2006.01)
G06Q 50/30 (2012.01)

(52) U.S. Cl.
CPC ... G06F 17/30876 (2013.01); G06F 17/30241 (2013.01); G06K 19/042 (2013.01); G06Q 50/30 (2013.01)

(58) Field of Classification Search
USPC .................................... 235/383, 384; 705/13
See application file for complete search history.

(56) References Cited

U.S. PATENT DOCUMENTS

| | | | |
|---|---|---|---|
| 8,255,159 B1* | 8/2012 | Bierbaum | G07B 15/02 235/382 |
| 2009/0325488 A1 | 12/2009 | Seol et al. | |
| 2010/0051689 A1* | 3/2010 | Diamond | G06Q 20/04 235/380 |
| 2013/0317747 A1* | 11/2013 | Chidlovskii | G06N 5/02 701/540 |
| 2014/0046737 A1* | 2/2014 | Graves | G06Q 20/0655 705/13 |
| 2015/0269786 A1* | 9/2015 | Cowen | G06F 17/30336 705/13 |

FOREIGN PATENT DOCUMENTS

| | | |
|---|---|---|
| CN | 103607694 A | 2/2014 |
| CN | 103617541 A | 3/2014 |
| CN | 104967722 A | 10/2015 |

OTHER PUBLICATIONS

International Search Report corresponding to PCT/CN2015/095005, dated Feb. 25, 2016, (12p).

* cited by examiner

*Primary Examiner* — Ahshik Kim
(74) *Attorney, Agent, or Firm* — Quarles & Brady LLP (57) ABSTRACT

A method, apparatus, and system are provided for displaying usage records. The method includes: reading a usage record stored in a transportation card and acquiring a terminal number corresponding to the usage record; transmitting a route identifier query request to a server, the route identifier query request including the terminal number corresponding to the usage record; receiving a route identifier of a vehicle associated with the terminal number of the usage record; and displaying the usage record as well as the route identifier of a vehicle associated with the terminal number corresponding to the usage record.

12 Claims, 7 Drawing Sheets

METHOD, APPARATUS, AND SYSTEM FOR DISPLAYING USAGE RECORDS

CROSS-REFERENCE TO RELATED APPLICATION

This application claims priority of the Chinese Patent Application No. 201510205717.4 filed on Apr. 27, 2015, which is hereby incorporated herein by reference in its entirety.

TECHNICAL FIELD

The disclosure relates to the field of computer technology, and in particular, to method, apparatus, and system for displaying usage records.

BACKGROUND

With development of mobile terminal related technologies, mobile terminals are being used more and more widely, and their functions are becoming more powerful. Many people, when travelling using public transportation, pay their transportation expense using a transportation card. Several mobile terminals are provided with a processor component for reading the transporting card to acquire usage records stored therein and can display the usage records to its user.

Specifically, when a transportation card is placed by a user next to a mobile terminal, the mobile terminal will read usage records stored in the transportation card and display the acquired usage records. For example, when a bus card is in direct contact with a mobile terminal, the mobile terminal will read usage records stored in the bus card and display the read the usage records on a screen. A usage record may include use time, amount of expenses, and terminal number of a card terminal used in that moment. However, the usage record is usually hard to understand and may not be up to date for newly established public transit routes.

SUMMARY

In order to address issues such as noted above, the disclosure provides a method, apparatus, and system for displaying usage records, as described below.

In a first aspect of the disclosure, a method for displaying usage records is provided. In the method, a mobile terminal reads a usage record stored in a transportation card and acquires a terminal number corresponding to the usage record. The mobile terminal then transmits a route identifier query request to a server, where the route identifier query request includes the terminal number corresponding to the usage record. The mobile terminal receives a route identifier of a vehicle associated with the terminal number corresponding to the usage record. The terminal displays the usage record as well as the route identifier of a vehicle associated with respective terminal number corresponding to the usage record.

In a second aspect of embodiments of the disclosure, a method for displaying usage records is provided. The method may be implemented by a server. In the method, the server receives a route identifier query request from a terminal, where the route identifier query request includes terminal numbers corresponding to usage records acquired from a transportation card. The server determines a route identifier of a vehicle associated with respective terminal number corresponding to at least one of the usage records based on pre-stored correspondence between terminal numbers and route identifiers of associated vehicles. The server transmits the route identifier of a vehicle associated with the respective terminal number corresponding to at least one of the usage records to the mobile terminal.

In a third aspect of embodiments of the disclosure, a mobile terminal is provided. The mobile terminal includes: a reading module read a usage record stored in a transportation card and acquire a terminal number corresponding to the usage record; a transmitting module configured to transmit a route identifier query request to a server, the route identifier query request carrying the terminal number corresponding to the usage record; a receiving module configured to receive a route identifier of a vehicle associated with the terminal number corresponding to the usage record; and a displaying module configured to display the usage record as well as the route identifier of a vehicle associated with the terminal number corresponding to the usage record.

In a fourth aspect of embodiments of the disclosure, a server is provided. The server includes: a receiving module configured to receive a route identifier query request from a terminal, the route identifier query request including a terminal numbers corresponding to usage records acquired from a transportation card; a determining module configured to determine a route identifier of a vehicle associated with respective terminal number corresponding to at least one of the usage records based on pre-stored correspondence between terminal numbers and route identifiers of associated vehicles; and a transmitting module configured to transmit the route identifier of a vehicle associated with respective terminal number corresponding to the at least one of the usage records to the mobile terminal.

In a fifth aspect of embodiments of the disclosure, an apparatus for displaying usage records is provided. The apparatus includes: a processor, a memory storing instructions executable by the processor. The processor is configured to: read usage records stored in a transportation card and acquiring a terminal number corresponding to respective one of the usage records; transmitting a route identifier query request to a server, the route identifier query request including the terminal number corresponding to respective one of the usage records; receive a route identifier of a vehicle associated with respective terminal number corresponding to at least one of the usage records; and display one or more of the usage records as well as the route identifier of a vehicle associated with respective terminal number corresponding to the at least one of the usage records.

In a sixth aspect of embodiments of the disclosure, an apparatus for displaying usage records is provided. The apparatus includes: a processor, a memory storing instructions executable by the processor. The processor is configured to: receive a route identifier query request from a terminal, the route identifier query request including terminal numbers corresponding to usage records acquired from a transportation card; determine a route identifier of a vehicle associated with respective terminal number corresponding to at least one of the usage records based on pre-stored correspondence between terminal numbers and route identifiers of associated vehicles; and transmit the route identifier of a vehicle associated with respective terminal number corresponding to the at least one of the usage records to the mobile terminal.

In a seventh aspect of embodiments of the disclosure, a system for displaying usage records is provided. The system includes a terminal and a server. The mobile terminal reads usage records stored in a transportation card and acquires a terminal number corresponding to respective one of the usage records; transmits a route identifier query request to the server, the route identifier query request including a terminal number corresponding to respective one of the usage records; receives, from the server, a route identifier of a vehicle associated with respective terminal number corresponding to at least one of the usage records; and displays one or more of the usage records as well as the route identifier of a vehicle associated with respective terminal number corresponding to the at least one of the usage records. The server receives the route identifier query request from the mobile terminal, the route identifier query request including terminal numbers corresponding to the usage records acquired from the transportation card; determines a route identifier of a vehicle associated with respective terminal number corresponding to the at least one of the usage records based on pre-stored correspondence between terminal numbers and route identifiers of associated vehicles; and transmits the route identifier of a vehicle associated with respective terminal number corresponding to the at least one of the usage records to the mobile terminal.

It should be understood that the forgoing general descriptions and the following detailed descriptions merely are exemplary and explanatory, and are not intended to limit the disclosure.

DESCRIPTION OF THE DRAWINGS

The appended drawings incorporated into and forming a part of the specification illustrate several embodiments of the disclosure, and may be used together with the descriptions to interpret the principle of the disclosure, in which.

Certain embodiments of the disclosure have been shown in the above figures and will be described in details hereinafter. The figures and the descriptions do not intend to limit scope of the disclosure in any manner, but intends to clarify concepts of the disclosure for a person skilled in the art by reference to some particular examples.

DETAILED DESCRIPTION

Certain exemplary embodiments will be described in details, and examples thereof are illustrated in the appended figures. In the following descriptions, the same reference number for various figures denotes the same or similar element, unless there is a particular indication. The examples described in the following exemplary embodiments do not represent all of embodiments according to the disclosure. As contrast, they are merely examples for some method and apparatus according to certain aspects of the disclosure and claimed by the claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

A method for displaying usage records is provided according to embodiments of the disclosure. The method may be performed by a terminal in cooperation with a server.

Figure 1:
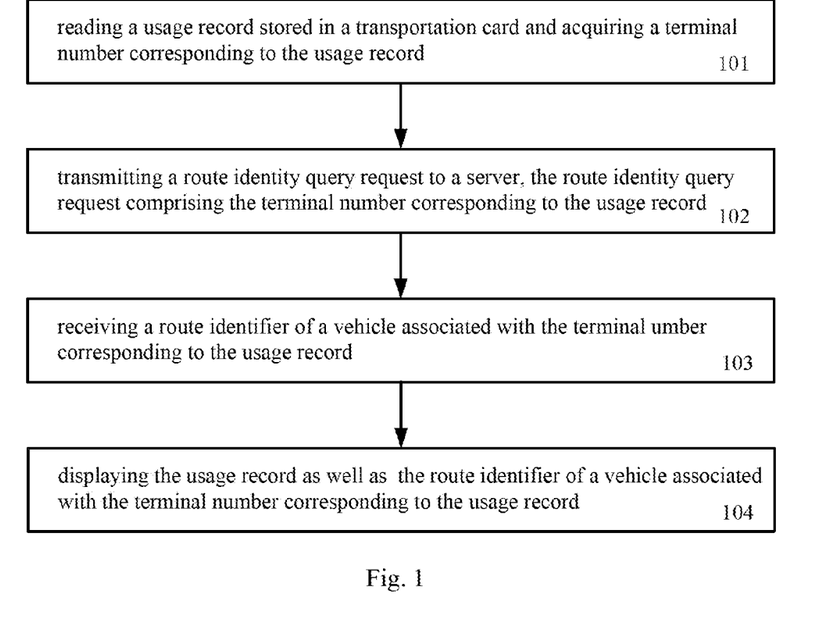
FIG. 1 is a flow chart illustrating a method for displaying usage records according to an exemplary embodiment of the disclosure.

As shown in FIG. 1, the method may be performed by the mobile terminal that includes a processor and a reading circuitry. The method may include the following steps:

At step 101, reading a usage record stored in a transportation card and acquiring a terminal number corresponding to the usage record. The terminal may reads all usage records stored in the transportation card or the most recent one during a time period set by the user of the terminal.

At step 102, transmitting a route identifier query request to a server, wherein the route identifier query request includes a terminal number corresponding to the usage record.

At step 103, receiving a route identifier of a vehicle associated with the terminal number corresponding to the usage record.

At step 104, displaying the one or more usage records as well as the route identifier of a vehicle associated with respective terminal number corresponding to the at least one of the usage records. The terminal may display all usage records and the route identifiers. Alternatively, the terminal may only display the most recent one during a time period set by the user of the terminal.

Figure 2:
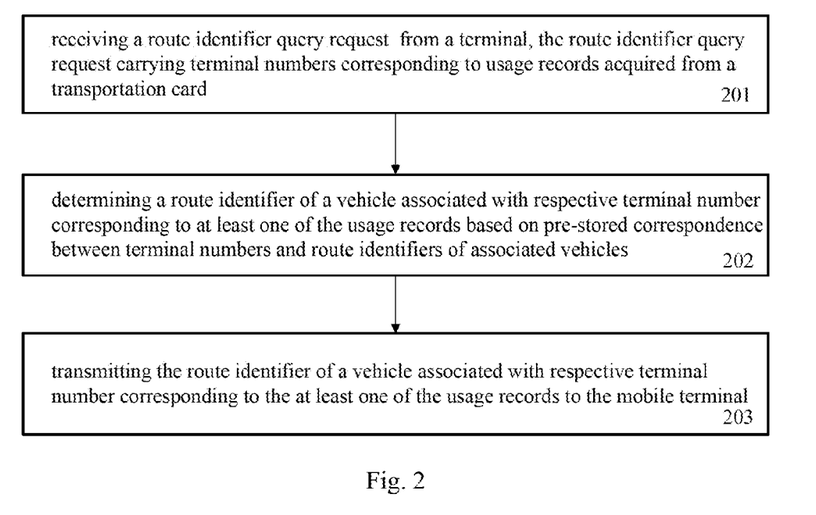
FIG. 2 is a flow chart illustrating a method for displaying usage records according to an exemplary embodiment of the disclosure.

As shown in FIG. 2, the procedure performed by the server in the method includes the following steps:

At step 201, the server receives a route identifier query request from a terminal, the route identifier query request including terminal numbers corresponding to usage records acquired from a transportation card.

At step 202, the server determines a route identifier of a vehicle associated with respective terminal number corresponding to at least one of the usage records based on pre-stored correspondence between terminal numbers and route identifiers of associated vehicles.

At step 203, the server transmits the route identifier of a vehicle associated with the respective terminal number corresponding to at least one of the usage records to the mobile terminal.

According to embodiments of the disclosure, with reading usage records stored in a transportation card and acquiring a terminal number corresponding to respective one of the usage records, transmitting a route identifier query request including the terminal number corresponding to respective one of the usage records to a server, receiving a route identifier of a vehicle associated with respective terminal number corresponding to at least one of the usage records, and displaying one or more of the usage records as well as the route identifier of a vehicle associated with respective terminal number corresponding to the at least one of the usage records, the terminal is able to obtain and display a route identifier of a vehicle associated with respective terminal numbers of a corresponding card terminal used when the user uses the transportation card such that the user is able to determine card use scene when the transportation card was used based on the route identifiers, and thereby efficiency for a user acquiring information may be improved.

A method of displaying usage records is provided according to embodiments of the disclosure. The method may be performed by a terminal in cooperation with a server. The terminal may be any terminal having a function of reading data stored in a transportation card, for example, a mobile terminal such as a mobile phone, tablet PC and the like. The server may be a background server for an application.

Figure 3:
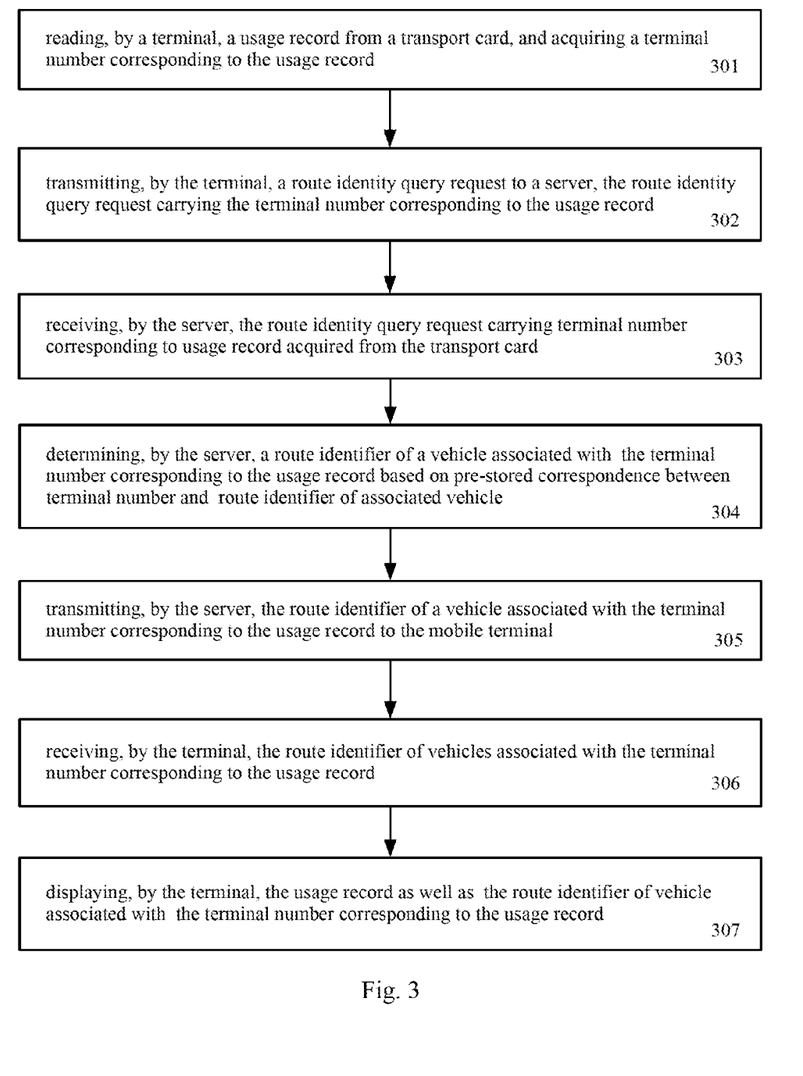
FIG. 3 is a flow chart illustrating a method for displaying usage records according to an exemplary embodiment of the disclosure.

As shown in FIG. 3, the procedure of the method may include the following steps:

At step 301, the terminal reads a usage record stored in a transportation card and acquires a terminal number corresponding to the usage record.

For example, the transportation card may be a payment card used to pay for transportation expense when a user travels with a vehicle, such as a bus card. After each use by the user, the transportation card records use data. For example, the transportation card may record use data including: use time of the transportation card, terminal number of a card terminal when the transportation card is used, amount of expense, or the like. The card terminal may include a machine identification number of a point of sale (POS) terminal provided in a bus. A transportation card can store several usage records.

A processor component for reading a transportation card may be set in the terminal by a technician in advance. The user can install an application for reading a transportation card in the terminal and start the application. When the user places the transportation card near to the terminal, the terminal will read usage records stored in the transportation card. The terminal can read all of usage records stored in the transportation card, or, read a predetermined number of usage records stored in the transportation card. After reading the usage records stored in the transportation card, the terminal can acquire a terminal number corresponding to respective one of the usage records.

At step 302, the terminal transmits a route identifier query request to a server, the route identifier query request carrying the terminal number corresponding to the usage record.

For example, after acquiring the terminal number corresponding to respective one of the usage records, the terminal transmits to a server a route identifier query request carrying the terminal number corresponding to respective one of the usage records. The terminal numbers contained in the route identifier query request may be sorted in a certain sequence (such as in a time sequence) or may be sorted in a random manner.

At step 303, the server receives the route identifier query request transmitted from the terminal, the route identifier query request carrying terminal numbers corresponding to the usage record acquired from the transportation card.

For example, after receiving the route identifier query request transmitted from the mobile terminal, the server can resolve the route identifier query request to obtain the terminal numbers contained therein for later processing.

At step 304, the server determines a route identifier of a vehicle associated with respective terminal number corresponding to the usage record based on pre-stored correspondence between terminal numbers and route identifiers of associated vehicles.

For example, the server may store correspondence between terminal numbers and route identifiers of associated vehicles in advance. After obtaining the terminal numbers, the server may search in the correspondence for a route identifier of a vehicle associated with respective one of the obtained terminal numbers. There may be the case where some terminal numbers are not recorded in the pre-stored correspondence such that the server cannot determine a route identifier of a vehicle associated with respective one of these terminal numbers. The correspondence may be stored by a technician in the server in advance, or alternatively, the correspondence may be established by collecting route identifier set requests sent from the user and creating correspondence between terminal numbers and route identifiers of associated vehicles. The corresponding procedure will be described below in details.

At step 305, the server transmits the route identifier of a vehicle associated with the terminal number corresponding to at least one of the usage record to the terminal.

For example, the server searches, in a pre-stored correspondence between terminal numbers and route identifiers of associated vehicles, for a route identifier of a vehicle associated with respective one of the obtained terminal numbers. The server then transmits the search results to the terminal, where the search results include one or more route identifiers. If the terminal numbers contained in the route identifier query request are sorted in a certain sequence, the server may place the searched route identifiers in the same sorted order and then transmit the same to the terminal. As to those terminal numbers for which no route identifier of associated vehicle is found in the server, the server may employ a preset identifier (such as Bus No. X or Bus No. 000) to label. The server may also transmit a correspondence between the obtained terminal numbers and the searched route identities of associated vehicles to the terminal for further processing.

At step 306, the terminal receives a route identifier of a vehicle associated with respective terminal number corresponding to the usage record. The terminal may receive the route identifier from the server.

For example, after the server transmits to the terminal a route identifier of a vehicle associated with respective terminal number corresponding to the at least one of the usage records, the terminal receives the message transmitted from the server and can make resolution to obtain the route identifier of a vehicle associated with respective terminal number corresponding to the at least one of the usage records for further processing.

At step 307, the terminal displays the usage record as well as the route identifier of a vehicle associated with the terminal number corresponding to the usage record.

Figure 4:
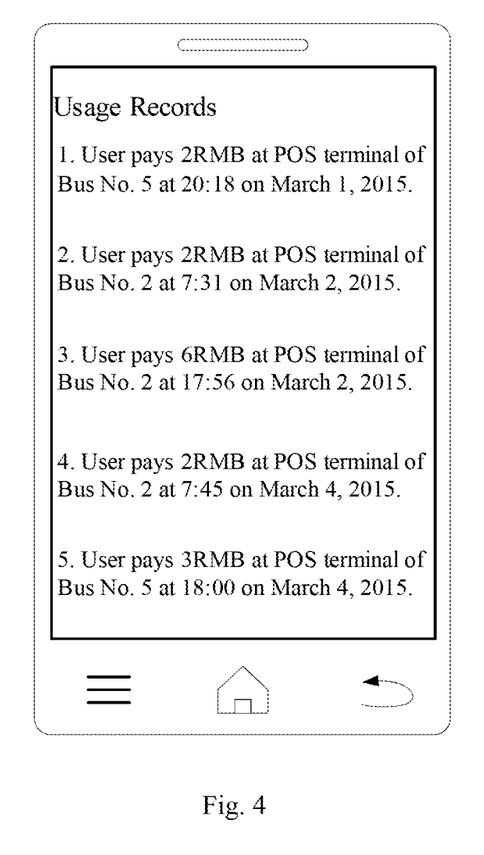
FIG. 4 is a schematic diagram illustrating an interface display according to an exemplary embodiment of the disclosure.

For example, after receiving the route identifier of a vehicle associated with respective terminal number corresponding to the at least one of the usage records from the server, the terminal may display one or more of the usage records as well as the route identifier of a vehicle associated with respective terminal number corresponding to the at least one of the usage records. In an example, the terminal may replace the terminal number in each usage record with a route identifier of associated vehicle and then display. For example, a history record may be displayed with use time 20:18, Mar. 1, 2015; amount of expense: 2 RMB; used card terminal: POS machine of Bus No. 5. Alternatively, the terminal may generate a user-readable sentence based on the received route identifiers of associated vehicles and the content of each usage record and then display the user-readable sentence. For example, for a history record with use time 20:18, Mar. 1, 2015; amount of expense: 2 RMB; terminal number of used card terminal: 001, if the route identifier of associated vehicle indicated by '001' is Bus No. 5, the terminal may display the following user-readable sentence: the user paid 2 RMB at POS terminal of Bus No. 5 at 20:18 on Mar. 1, 2015. The terminal may employ various display forms, for example, the terminal may use a list form to display, as shown in FIG. 4. When no route identifier of the associated vehicle is found, the terminal may highlight the preset identifier displayed on the terminal.

In addition, as to a usage record for which no route identifier of associated vehicle is received, the terminal displays the content of the usage record but does not display any route identifier of associated vehicle. Alternatively, the terminal does not display the usage record but prompts the user with that there is no corresponding route identifier of associated vehicle for the terminal number.

Alternatively or additionally, in the case where the correspondence is established according to identity route identifier set request transmitted by the user, the terminal may operate as follows: upon reception of a selection command for a first usage record among the displayed usage records, the terminal acquires a first terminal number corresponding to the first usage record and a first route identifier inputted by the user; and transmits a route identifier set request to the server, the route identifier set request carrying the first terminal number and the first route identifier.

In an embodiment, when the terminal displays contents of the usage records but does not display route identifiers of associated vehicles, or when the terminal displays route identifiers of associated vehicle for the displayed usage records but find there is an error, the user may operate the terminal to make settings or corrections on the route identifiers of associated vehicle for the usage records. For example, when user clicks a usage record to be set (i.e. the first usage record) among the displayed usage records, the terminal receives a selection command for the first usage record, and accordingly an input box is displayed. The user is allowed to input a route identifier to be set (i.e. the first route identifier) and then presses a confirmation button. Accordingly, the terminal may get the terminal number of the first usage record (i.e. the first terminal number) and the first route identifier inputted by the user. Then, the terminal can transmit to the server a route identifier set request carrying the first terminal number and the first route identifier.

Alternatively or additionally, in the case where the correspondence is established according to identity route identifier set request transmitted by the user, the server may operate as follows: the server receives the route identifier set request transmitted by the terminal, the route identifier set request carrying the first terminal number and the first route number, determines, from received route identifier set request containing the first terminal number, the number of route identifier set request containing the first route identifier, and adds the first terminal number and the first route identifier to the correspondence between terminal numbers and route identifiers of associated vehicles if the number exceeds a predetermined threshold.

In an embodiment, upon reception of the route identifier set request transmitted from the terminal, the server can resolve the route identifier set request to obtain the first terminal number and the first route identifier. Then, the server can search from received route identifier set requests the route identifier set requests containing the first terminal number, and then determines the number of route identifier set requests containing the first route identifier among the searched route identifier set requests. If the number is equal to or larger than a predetermined threshold, the server adds the first terminal number and the first route identifier to the correspondence between terminal numbers and route identifiers of associated vehicles. If the number is smaller than the predetermined threshold, the correspondence between terminal numbers and route identifiers of associated vehicles is kept unchanged and the route identifier set request is stored.

Alternatively or additionally, the server can periodically updates the correspondence between terminal numbers and route identifiers of associated vehicles. Specifically, if a terminal number (referred to as a second terminal number) corresponds to multiple route identifiers, the server can select a route identifier corresponding to the route identifier set requests whose number is maximum (referred to as a second route identifier) as the route identifier of a vehicle associated with the terminal number, and adds the second terminal number and the second route identifier to the correspondence between terminal numbers and route identifiers of associated vehicles.

Alternatively, the correspondence between terminal numbers and route identifiers of associated vehicles can also be set by the owner of a terminal machine corresponding to a terminal number. Specifically, an interface for displaying usage records may be set with a declaration option. When the declaration option is clicked by the owner, the terminal displays an declaration interface in which a terminal number input box, a route identifier input box, owner's identity input box or the like may be set. The terminal's owner then can input a terminal number, identity route identifier, the owner's identity in the declaration interface and then click a confirmation option. Accordingly, the terminal will transmit the information input by the owner to the server. Upon reception of the information, the server can make verification on the owner's identity, and if the verification is successful, the server adds the received terminal number and the route identifier to correspondence between terminal numbers and route identifiers of associated vehicles, or updates pre-stored correspondence between terminal numbers and route identifiers of associated vehicles.

Alternatively or additionally, the user can also inquire a vehicle identifier of a vehicle associated with respective terminal number. In this case, the server may operate as follows: the server determines a vehicle identifier of a vehicle associated with respective terminal number corresponding to at least one of the usage records based on pre-stored correspondence between terminal numbers and vehicle identifiers of associated vehicles; and transmits the vehicle identifier of a vehicle associated with respective terminal number corresponding to the at least one of the usage records to the mobile terminal.

In an embodiment, the server can store correspondence between terminal numbers and vehicle identifiers of associated vehicles in advance and after obtaining the terminal numbers, the server can search in the correspondence for a vehicle identifier of a vehicle associated with respective one of the obtained terminal numbers. There may be the case where some terminal numbers are not recorded in the correspondence such that the server cannot determine a vehicle identifier of a vehicle associated with respective one of these terminal numbers. The correspondence may be stored in the server by a technician in advance, or alternatively, the correspondence may be established by collecting vehicle identifier set requests sent from the user and creating correspondence between terminal numbers and vehicle identifiers of associated vehicles. The process for establishment may be the same as the process for establishing the correspondence between terminal numbers and route identifiers of associated vehicles, and thus will not be described repeatedly.

After searching out a vehicle identifier of a vehicle associated with respective terminal number in the pre-stored correspondence between terminal numbers and vehicle identifiers of associated vehicles, the server can transmit the searched result to the terminal. If the terminal numbers contained in the vehicle identifier query request are sorted in a certain sequence, the server can place the searched vehicle identifiers in the same order and then transmit the same to the terminal. As to those terminal numbers for which no vehicle identifier of associated vehicle is found, the server may employ a preset identifier to label. The server may also transmit a correspondence between the obtained terminal numbers and the searched vehicle identifiers of associated vehicles to the terminal for further processing.

Alternatively or additionally, in the case where the user can also inquire a vehicle identifier of a vehicle associated with respective terminal number, the terminal may operate as follows: the terminal receives, from the server, a vehicle identifier of a vehicle associated with respective terminal number corresponding to at least one of the usage records; and displays the vehicle identifier of a vehicle associated with respective terminal number corresponding to the at least one of the usage records.

In an embodiment, after the server transmits to the terminal a vehicle identifier of a vehicle associated with respective terminal number corresponding to the at least one of the usage records, the terminal receives the message transmitted from the server and can make resolution to obtain the route identifier of a vehicle associated with respective terminal number corresponding to the at least one of the usage records, and display one or more of the usage records as well as the route identifier of a vehicle associated with respective terminal number corresponding to the at least one of the usage records. The terminal can employ various display forms. The display form for displaying the vehicle identifier may be the same as the display form for displaying the route identifier, and thus will not be described repeatedly.

According to the embodiment of the disclosure, with reading usage records stored in a transportation card and acquiring a terminal number corresponding to respective one of the usage records, transmitting a route identifier query request carrying the terminal number corresponding to respective one of the usage records to a server, receiving, from the server, a route identifier of a vehicle associated with respective terminal number corresponding to at least one of the usage records, and displaying one or more of the usage records as well as the route identifier of a vehicle associated with respective terminal number corresponding to the at least one of the usage records, the terminal is able to obtain and display a route identifier of a vehicle associated with respective terminal numbers of a corresponding card terminal used when the user uses the transportation card such that the user is able to determine card use scene when the transportation card was used based on the route identifiers, and thereby efficiency for a user acquiring information may be improved.

Figure 5:
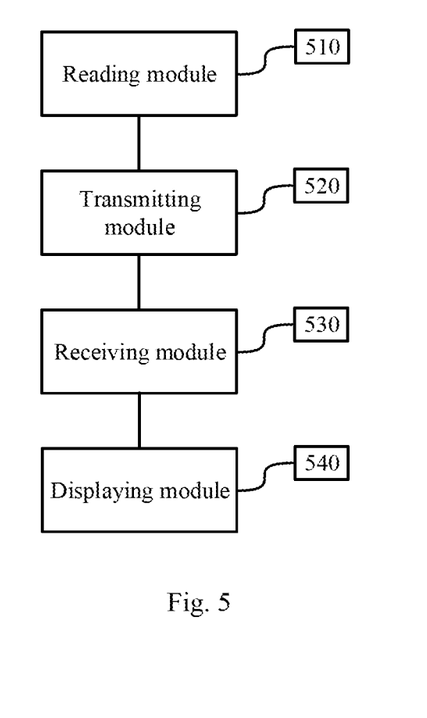
FIG. 5 is a schematic diagram illustrating structure of a mobile terminal according to an exemplary embodiment of the disclosure.

Based on the same concept, a terminal is provided according to the embodiment of the disclosure. As shown in FIG. 5, the terminal includes: a reading module 510, a transmitting module 520, a receiving module 530, and a displaying module 540.

The reading module 510 is configured to read usage records stored in a transportation card and acquiring a terminal number corresponding to respective one of the usage records. The reading module 510 may include a card reading circuitry to read the information stored in the transportation card. The card reading circuitry may include IC circuits to communicate with the different transportation cards. The IC circuits may use Radio Frequency Identification (RFID) technology, Infrared Data Association (IrDA) technology, Ultra Wideband (UWB) technology, Blue Tooth (BT) technology and other technologies to communicate with the transportation card.

The transmitting module 520 is configured to transmit a route identifier query request to a server, the route identifier query request carrying the terminal number corresponding to respective one of the usage records.

The receiving module 530 is configured to receive, from the server, a route identifier of a vehicle associated with respective terminal number corresponding to at least one of the usage records.

The displaying module 540 is configured to display one or more of the usage records as well as the route identifier of a vehicle associated with respective terminal number corresponding to the at least one of the usage records.

Alternatively or additionally, the receiving module 530 is further configured to receive, from the server, a vehicle identifier of a vehicle associated with respective terminal number corresponding to at least one of the usage records; and the displaying module 540 is further configured to display the vehicle identifier of a vehicle associated with respective terminal number corresponding to the at least one of the usage records.

Figure 6:
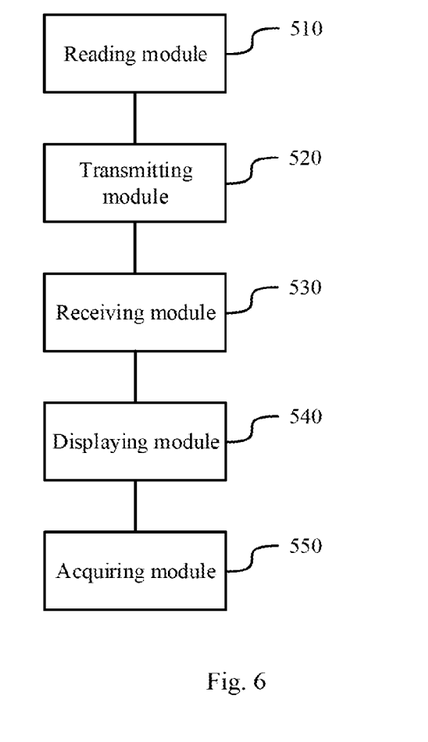
FIG. 6 is a schematic diagram illustrating structure of a mobile terminal according to an exemplary embodiment of the disclosure.

Alternatively or additionally, as shown in FIG. 6, the terminal further includes an acquiring module 550 configured to acquire, upon reception of a selection command for a first usage record among the displayed usage records, a first terminal number corresponding to the first usage record and a first route identifier inputted by a user. The transmitting module 520 is further configured to transmit a route identifier set request to the server, the route identifier set query request carrying the first terminal number and the first route identifier.

Figure 7:
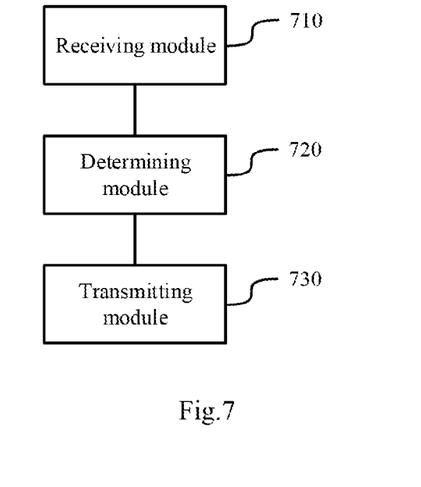
FIG. 7 is a schematic diagram illustrating structure of a server according to an exemplary embodiment of the disclosure.

Based on the same concept, a server is provided according to the embodiment of the disclosure. As shown in FIG. 7, the server includes: a receiving module 710, a determining module 720, and a transmitting module 730.

The receiving module 710 is configured to receive a route identifier query request from a terminal, the route identifier query request carrying a terminal numbers corresponding to usage records acquired from a transportation card.

The determining module 720 is configured to determine a route identifier of a vehicle associated with respective terminal number corresponding to at least one of the usage records based on pre-stored correspondence between terminal numbers and route identifiers of associated vehicles.

The transmitting module 730 is configured to transmit the route identifier of a vehicle associated with respective terminal number corresponding to the at least one of the usage records to the mobile terminal.

Alternatively or additionally, the determining module 720 is further configured to determine a vehicle identifier of a vehicle associated with respective terminal number corresponding to the at least one of the usage records based on pre-stored correspondence between terminal numbers and vehicle identifiers of associated vehicles, and the transmitting module 730 is further configured to transmit the vehicle identifier of a vehicle associated with respective terminal number corresponding to the at least one of the usage records to the mobile terminal.

Alternatively or additionally, the receiving module 710 is further configured to receive a route identifier set request from the mobile terminal, the route identifier set request carrying a first terminal number and a first route identifier, and the determining module 720 is configured to determine, from received route identifier set requests carrying the first terminal number, the number of route identifier set requests containing the first route identifier, and add the first terminal number and the first route identifier to the correspondence between terminal numbers and route identifiers of associated vehicles if the number exceeds a predetermined threshold.

Of the terminal and the server in the present embodiment, specific operations of respective modules have been described in details in embodiments of related methods, and thus will not be described in details herein.

According to the embodiment of the disclosure, with reading usage records stored in a transportation card and acquiring a terminal number corresponding to respective one of the usage records, transmitting a route identifier query request carrying the terminal number corresponding to respective one of the usage records to a server, receiving, from the server, a route identifier of a vehicle associated with respective terminal number corresponding to at least one of the usage records, and displaying one or more of the usage records as well as the route identifier of a vehicle associated with respective terminal number corresponding to the at least one of the usage records, the terminal is able to obtain and display a route identifier of a vehicle associated with respective terminal numbers of a corresponding card terminal used when the user uses the transportation card such that the user is able to determine card use scene when the transportation card was used based on the route identifiers, and thereby efficiency for a user acquiring information may be improved.

Based on the same concept, a system for displaying usage records is provided according to the embodiment of the disclosure. The system includes a terminal and a server, wherein the mobile terminal reads usage records stored in a transportation card and acquires a terminal number corresponding to respective one of the usage records;

transmits a route identifier query request to the server, the route identifier query request carrying a terminal number corresponding to respective one of the usage records; receives, from the server, a route identifier of a vehicle associated with respective terminal number corresponding to at least one of the usage records; and displays one or more of the usage records as well as the route identifier of a vehicle associated with respective terminal number corresponding to the at least one of the usage records; and the server receives the route identifier query request from the mobile terminal, the route identifier query request carrying terminal numbers corresponding to the usage records acquired from the transportation card; determines a route identifier of a vehicle associated with respective terminal number corresponding to the at least one of the usage records based on pre-stored correspondence between terminal numbers and route identifiers of associated vehicles; and transmits the route identifier of a vehicle associated with respective terminal number corresponding to the at least one of the usage records to the mobile terminal.

According to the embodiment of the disclosure, with reading usage records stored in a transportation card and acquiring a terminal number corresponding to respective one of the usage records, transmitting a route identifier query request carrying the terminal number corresponding to respective one of the usage records to a server, receiving, from the server, a route identifier of a vehicle associated with respective terminal number corresponding to at least one of the usage records, and displaying one or more of the usage records as well as the route identifier of a vehicle associated with respective terminal number corresponding to the at least one of the usage records, the terminal is able to obtain and display a route identifier of a vehicle associated with respective terminal numbers of a corresponding card terminal used when the user uses the transportation card such that the user is able to determine card use scene when the transportation card was used based on the route identifiers, and thereby efficiency for a user acquiring information may be improved.

Figure 8:
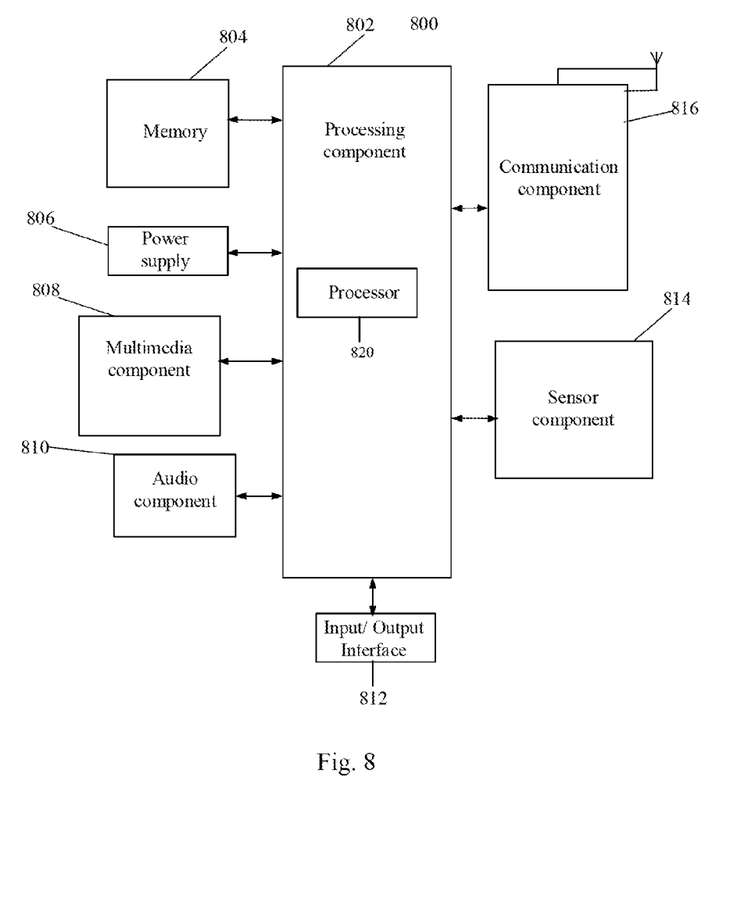
FIG. 8 is a schematic diagram illustrating structure of a mobile terminal according to an exemplary embodiment of the disclosure.

A schematic diagram illustrating structure of a terminal according to the embodiment of the disclosure is shown. The terminal may be a mobile phone or the like.

As shown in FIG. 8, the terminal can includes one or more components: a processing component 802, a memory 804, a power supply component 806, a multimedia component 808, an audio component 810, an input/output (I/O) interface 812, a sensor component 814 and a communication component 816.

The processing component 802 typically controls entire operations of the terminal 800, such as operations relevant to displaying, phone calling, data communication, camera operation, and recording operation. The processing component 802 can include one or more processors 820 for executing instructions to implement all of or a part of steps of the method as described above. Further, the processing component 802 can includes one or more modules for assisting interaction between the processing component 802 and other components. For example, the processing component 802 can include a multimedia module for interaction between the multimedia component 808 and the processing component 802.

The memory 804 is configured to store any kind of data in order for supporting operations of the terminal 800. Some examples of the data include any application or method specific instructions for execution on the terminal 800, contact data, phone book data, messages, pictures, videos and so on. The memory 804 may be implemented as any kind of volatile and non-volatile storage device or any combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic or optical disk.

The power supply component 806 supplies power to the various components of the terminal 800. The power supply component 806 can include a power management system, one or more power supplies and other components associated with power generation, management and allocation of the apparatus 800.

The multimedia component 808 includes a screen for providing an output interface between the terminal 800 and the user. In some embodiments, the screen can include Liquid Crystal Display (LCD) and Touch Panel (TP). In the case where the screen includes a touch panel, the screen may be implemented as a touch screen for receiving input signals from the user. The touch panel includes one or more touch sensors for sensing touches, sliding, and gestures on the touch panel. The touch sensor not only can sense boundary line of an action of touch or sliding, but also can sense duration period and pressure of the action of touch or sliding. In some embodiments, the multimedia component 808 includes a frond camera and/or a rear camera. When the terminal 800 is in an operation mode such as picture mode or video mode, the front camera and/or the rear camera can receive multimedia data from outside. One or more of the front camera and the rear camera may be a fixed optical lens system or has capability of focus and optical zoom.

The audio component 810 is configured to input and/or output audio signals. For example, the audio component 810 includes a microphone (MIC), and when the apparatus 800 is in an operation mode such as calling mode, recording mode or voice recognition mode, the microphone is configured to receive audio signals from outside. The received audio signals may be further stored in the memory 804 or transmitted via the communication component 816.

The I/O interface 812 provides an interface between the processing component 802 and a periphery interface module. The periphery interface module may be a keyboard, a click wheel, and buttons or the like. The buttons include but are not limited to a home page button, a volume button, a start button, and a lock button.

The sensor component 814 includes one or more sensors for providing the terminal 800 with various aspects of status estimations. For example, the sensor component 814 can sense open/close status of the terminal 800 and relative position of a component, for example, the component may be the display or the small keyboard of the terminal 800. The sensor component 814 can also sense change in position of the terminal 800 or a component thereof, presence of contact by a user with the terminal 800, direction, acceleration, deceleration of the terminal 800, and change in temperature of the terminal 800. The sensor component 814 can also include an approaching sensor configured to sense presence of adjacent objects without any physical contact. The sensor component 814 can also include an optical sensor such as CMOS or CCD image sensor for use in image capture. In an embodiment, the sensor component 814 can also include an acceleration sensor, a gyroscope sensor, a magnetic sensor, a pressure sensor or a temperature sensor.

The communication component 816 is configured to assist wired or wireless communication between the terminal 800 and other devices. The terminal 800 can access a wireless network based on a communication standard such as WiFi, 2G or 3G or any combination thereof. In an exemplary embodiment, the communication component 816 receives broadcast signals or broadcast related information from an outside broadcast management system via a broadcast channel. In an exemplary embodiment, the communication component 816 can also include a Near Field Communication (NFC) module for assisting short range communication. For example, the NFC module may be implemented based on Radio Frequency Identification (RFID) technology, Infrared Data Association (IrDA) technology, Ultra Wideband (UWB) technology, Blue Tooth (BT) technology and other technologies.

In an exemplary embodiment, the terminal 800 may be implemented with processing circuitry including one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, or other electronic elements for performing the method as described above. Each module, such as discussed with respect to FIGS. 5-7, may take the form of a packaged functional hardware unit designed for use with other components, a portion of a program code (e.g., software or firmware) executable by the processor 820 or the processing circuitry that usually performs a particular function of related functions, or a self-contained hardware or software component that interfaces with a larger system, for example.

In an exemplary embodiment, there provides a non-transitory computer readable storage medium containing instructions, such as the memory 804 having instructions that are executable by the processor(s) 820 to perform the method as described above. For example, the non-transitory computer readable storage medium may be a ROM, a RAM, a CD-ROM, a magnetic disk, a floppy disk, an optical data storage device or the like.

A non-transitory computer readable storage medium may store instructions. The instructions may be executed by a processor of a mobile terminal, enables the terminal to perform following acts.

reading a usage record stored in a transportation card and acquiring a terminal number corresponding to the usage record;

transmitting a route identifier query request to a server, the route identifier query request carrying the terminal number corresponding to the usage record;

receiving, from the server, a route identifier of a vehicle associated with respective terminal number corresponding to at least one of the usage record; and displaying one or more of the usage record as well as the route identifier of a vehicle associated with respective terminal number corresponding to the at least one of the usage records.

The method may further include: receiving, from the server, a vehicle identifier of a vehicle associated with respective terminal number corresponding to at least one of the usage records; and displaying the vehicle identifier of a vehicle associated with respective terminal number corresponding to the at least one of the usage records.

Alternatively or additionally, the method further includes: upon reception of a selection command for a first usage record among the displayed usage records, acquiring a first terminal number corresponding to the first usage record and a first route identifier inputted by a user; and transmitting a route identifier set request to the server, the route identifier set request carrying the first terminal number and the first route identifier.

According to the embodiment of the disclosure, with reading usage records stored in a transportation card and acquiring a terminal number corresponding to respective one of the usage records, transmitting a route identifier query request carrying the terminal number corresponding to respective one of the usage records to a server, receiving, from the server, a route identifier of a vehicle associated with respective terminal number corresponding to at least one of the usage records, and displaying one or more of the usage records as well as the route identifier of a vehicle associated with respective terminal number corresponding to the at least one of the usage records, the terminal is able to obtain and display a route identifier of a vehicle associated with respective terminal numbers of a corresponding card terminal used when the user uses the transportation card such that the user is able to determine card use scene when the transportation card was used based on the route identifiers, and thereby efficiency for a user acquiring information may be improved.

Figure 9:
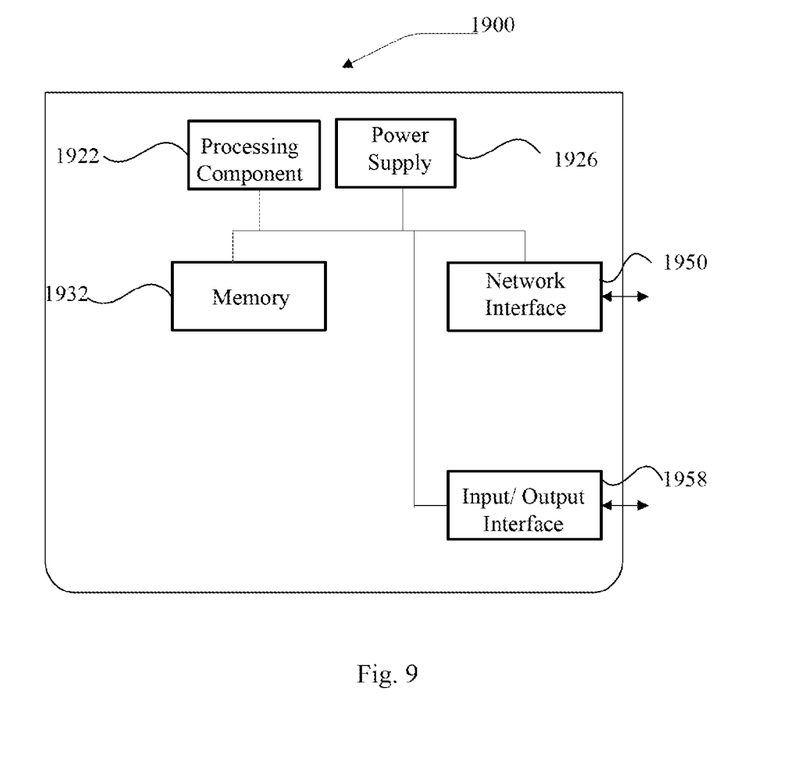
FIG. 9 is a schematic diagram illustrating structure of a server according to an exemplary embodiment of the disclosure.

FIG. 9 is a block diagram illustrating an apparatus for display usage records according to an exemplary embodiment of the disclosure. For example, the apparatus 1900 may be a server. As shown in FIG. 9, the apparatus 1900 includes a processing component 1922 which in turn includes one or more processors, and memory resources, represented by the memory 1932, for storing instructions such as applications executable by the processing component 1922. The applications stored in the memory 1932 can include one or more modules with each module corresponding to a set of instructions. Further, the processing component 1922 is configured to perform instructions to implement the method for displaying usage record as described above.

The apparatus 1900 further includes a power supply component 1926 configured to perform power management of the apparatus 1900; a wired or wireless network interface 1950 configured to connect the apparatus 1900 to a network; and an input/output (I/O) interface 1958. The apparatus can operate based on an operation system such as Windows Server™, Mac OS X™, Unix™, Linux™, FreeBSD™ or the like stored in the memory 1932.

The apparatus 1900 can include a memory and one or more programs, wherein the one or more programs are stored in the memory, and the apparatus 1900 is configured such that one or more processors execute instructions contained in the one or more programs for performing the following operations:

receiving a route identifier query request from a terminal, the route identifier query request carrying terminal numbers corresponding to usage records acquired from a transportation card;

determining a route identifier of a vehicle associated with respective terminal number corresponding to at least one of the usage records based on pre-stored correspondence between terminal numbers and route identifiers of associated vehicles; and transmitting the route identifier of a vehicle associated with the respective terminal number corresponding to at least one of the usage records to the mobile terminal.

Alternatively or additionally, the method may further include:

determining a vehicle identifier of a vehicle associated with respective terminal number corresponding to at least one of the usage records based on pre-stored correspondence between terminal numbers and vehicle identifiers of associated vehicles; and transmitting the vehicle identifier of a vehicle associated with the respective terminal number corresponding to the at least one of the usage records to the mobile terminal.

Alternatively or additionally, the method may further include:

receiving a route identifier set request from the mobile terminal, the route identifier set request carrying a first terminal number and a first route identifier;

determining, from received route identifier set requests containing the first terminal number, the number of route identifier set requests containing the first route identifier, and adding the first terminal number and the first route identifier to the correspondence between terminal numbers and route identifiers of associated vehicles if the number exceeds a predetermined threshold.

According to the embodiment of the disclosure, with reading usage records stored in a transportation card and acquiring a terminal number corresponding to respective one of the usage records, transmitting a route identifier query request carrying the terminal number corresponding to respective one of the usage records to a server, receiving, from the server, a route identifier of a vehicle associated with respective terminal number corresponding to at least one of the usage records, and displaying one or more of the usage records as well as the route identifier of a vehicle associated with respective terminal number corresponding to the at least one of the usage records, the terminal is able to obtain and display a route identifier of a vehicle associated with respective terminal numbers of a corresponding card terminal used when the user uses the transportation card such that the user is able to determine card use scene when the transportation card was used based on the route identifiers, and thereby efficiency for a user acquiring information may be improved.

With considering disclosure of the present specification and doing practices accordingly, it is obvious for a person skilled in the art to anticipate other embodiments of the disclosure. The application intends to cover all of variations, applications and adaption of the disclosure, which comply with the general concept of the disclosure and include those customary technical means or common knowledge in the art that are not disclosed in the disclosure. The specification and embodiments are merely considered to be exemplary and the substantive scope and spirit of the disclosure is limited only by the appended claims.

It should be understood that the disclosure is not limited to the precise structure as described above and shown in the figures, but can have various modification and alternations without departing from the scope of the disclosure. The scope of the disclosure is limited only by the appended claims.

What is claimed is:

1. A method for displaying usage records, comprising:
reading, by a device comprising a processor and reading circuitry, a usage record stored in a transportation card and acquiring a terminal number corresponding to the usage record;
transmitting, by the device, a route identifier query request to a server, the route identifier query request comprising the terminal number corresponding to the usage record;
receiving, by the device, a route identifier of a vehicle associated with the terminal number corresponding to the usage record; and displaying, by the device, the usage record as well as the route identifier of the vehicle associated with the terminal number corresponding to the usage record.

2. The method of claim 1, further comprising:

receiving, from the server, a vehicle identifier of the vehicle associated with the terminal number corresponding to the usage record; and displaying, by the device, the vehicle identifier of the vehicle associated with the terminal number corresponding to the usage record.

3. The method of claim 1, further comprising:

upon reception of a selection command for a first usage record, acquiring a first terminal number corresponding to the first usage record and a first route identifier inputted by a user; and transmitting a route identifier set request to the server, the route identifier set request comprising the first terminal number and the first route identifier.

4. The method of claim 1, further comprising:

obtaining a preset identifier from the server when no route identifier of the associated vehicle is found in the server; and displaying the preset identifier with highlight on the terminal.

5. An apparatus for displaying usage records, comprising:

a processor, a memory storing instructions executable by the processor;

wherein the processor is configured to:

read a usage record stored in a transportation card and acquire a terminal number corresponding to the usage record;

transmit a route identifier query request to a server, the route identifier query request comprising the terminal number corresponding to the usage record;

receive a route identifier of a vehicle associated with the terminal number corresponding to the usage record; and display the usage record as well as the route identifier of a vehicle associated with the terminal number corresponding to the usage record.

6. The apparatus of claim 5, wherein the processor is further configured to receive, from the server, a vehicle identifier of a vehicle associated with the terminal number corresponding to the usage record; and the processor is further configured to display the vehicle identifier of a vehicle associated with the terminal number corresponding to the usage record.

7. The apparatus claim 5, wherein the processor is further configured to acquire, upon reception of a selection command for a first usage record, a first terminal number corresponding to the first usage record and a first route identifier inputted by a user; and the processor is further configured to transmit a route identifier set request to the server, the route identifier set query request comprising the first terminal number and the first route identifier.

8. The apparatus claim 5, wherein the processor is further configured to obtain a preset identifier from the server when no route identifier of the associated vehicle is found in the server; and display the preset identifier with highlight on the terminal.

9. A non-transitory computer readable storage medium, the non-transitory computer readable storage medium storing instructions, when executed by a processor of a mobile terminal, enables the mobile terminal to perform acts comprising:

reading a usage record stored in a transportation card and acquiring a terminal number corresponding to the usage record;

transmitting a route identifier query request to a server, the route identifier query request comprising the terminal number corresponding to the usage record;

receiving a route identifier of a vehicle associated with the terminal number corresponding to the usage record; and displaying the usage record as well as the route identifier of a vehicle associated with the terminal number corresponding to the usage record.

10. The non-transitory computer readable storage medium of claim 9, wherein the acts further comprise:

receiving, from the server, a vehicle identifier of a vehicle associated with respective terminal number corresponding to the usage record; and displaying the vehicle identifier of a vehicle associated with the terminal number corresponding to the usage record.

11. The non-transitory computer readable storage medium of claim 9, wherein the acts further comprise:

upon reception of a selection command for a first usage record displayed on the electronic device, acquiring a first terminal number corresponding to the first usage record and a first route identifier inputted by a user; and transmitting a route identifier set request to the server, the route identifier set request comprising the first terminal number and the first route identifier.

12. The non-transitory computer readable storage medium of claim 9, wherein the acts further comprise:

obtaining a preset identifier from the server when no route identifier of the associated vehicle is found in the server; and displaying the preset identifier with highlight on the terminal.

* * * * *